United States Patent [19]

Lebowitz

[11] 4,378,889
[45] Apr. 5, 1983

[54] SPICE RACK AND BRACKET ASSEMBLY

[75] Inventor: Sam Lebowitz, New York, N.Y.

[73] Assignee: Copco, Inc., Secaucus, N.J.

[21] Appl. No.: 247,853

[22] Filed: Mar. 26, 1981

[51] Int. Cl.³ .................................................. A47F 7/28
[52] U.S. Cl. ........................................ 211/75; 211/74
[58] Field of Search ................ 211/88, 74, 75, 71, 211/72, 87; 248/300, 309 R, 310, 311.2

[56] References Cited

U.S. PATENT DOCUMENTS

| | | | |
|---|---|---|---|
| 1,610,834 | 12/1926 | Webster | 211/74 |
| 1,962,608 | 6/1934 | McEachern | 211/74 |
| 2,145,879 | 2/1939 | Jewett | 211/74 X |
| 3,774,774 | 11/1973 | Wenkel | 211/74 X |
| 4,064,992 | 12/1977 | Ralston et al. | 211/75 |

Primary Examiner—Francis K. Zugel
Assistant Examiner—Robert W. Gibson, Jr.

Attorney, Agent, or Firm—Michael Ebert

[57] ABSTRACT

A spice rack and bracket assembly whose rack is adapted to hold an array of bottles containing different spices and whose bracket is selectively adapted to support the rack in any one of these modes, whereby one may hang the rack on a wall, or cause it to lie flat on a counter or to stand thereon. The rack is constituted by a staircase frame having a series of steps, each formed by a landing and a wall normal thereto, the step landing having a row of semi-circular notches therein, each of which lies in registration with a row of semi-circular wells projecting rearwardly from the associated wall to define one half of a bottle-receiving socket which is completed by a semi-circular shield projecting forwardly from the wall. The uppermost landing and lowermost wall of the frame are provided with slots which cooperate with tongues formed on the triangular sides of the bracket to support the rack in any desired mode.

8 Claims, 13 Drawing Figures

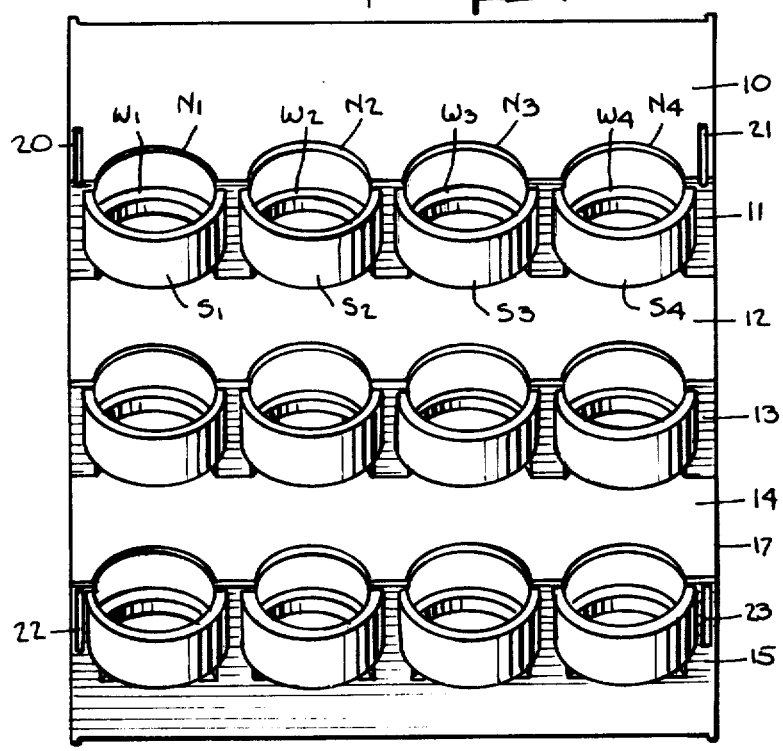
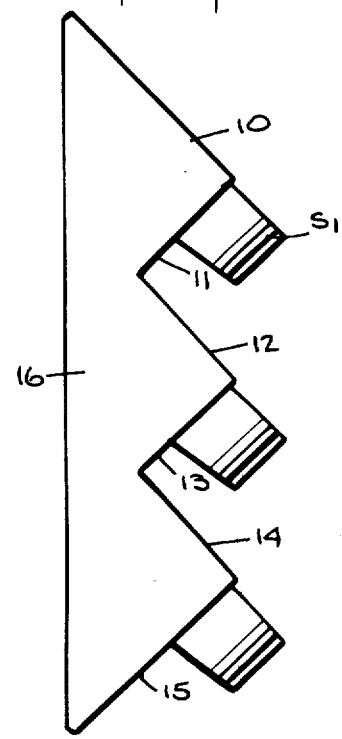
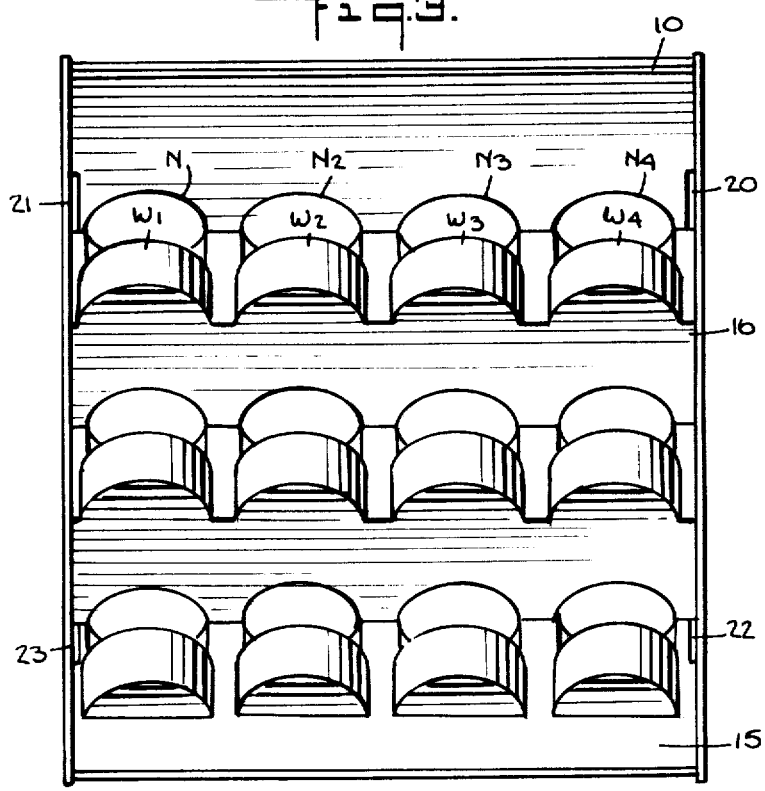
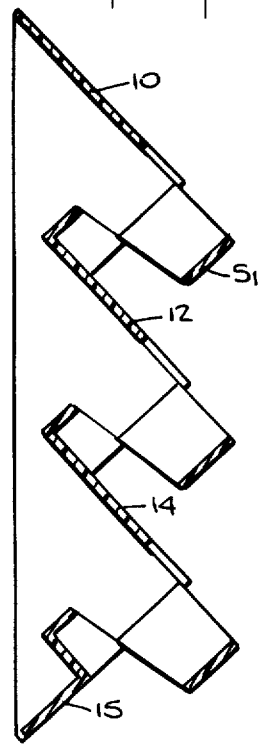

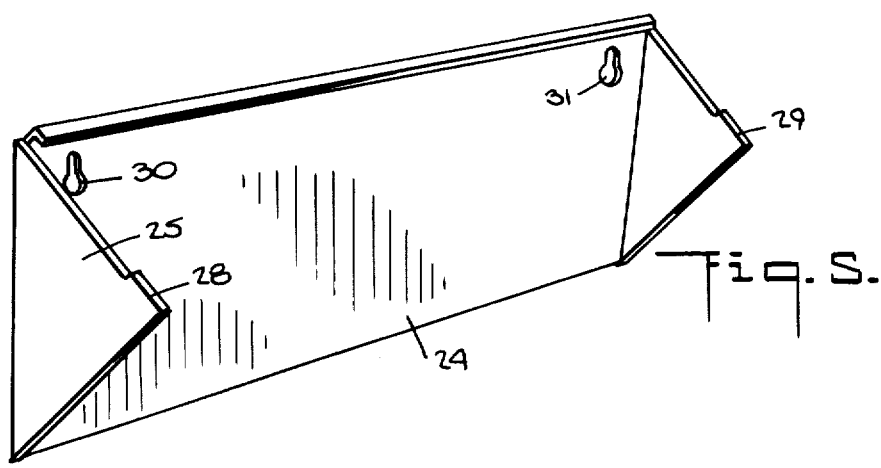
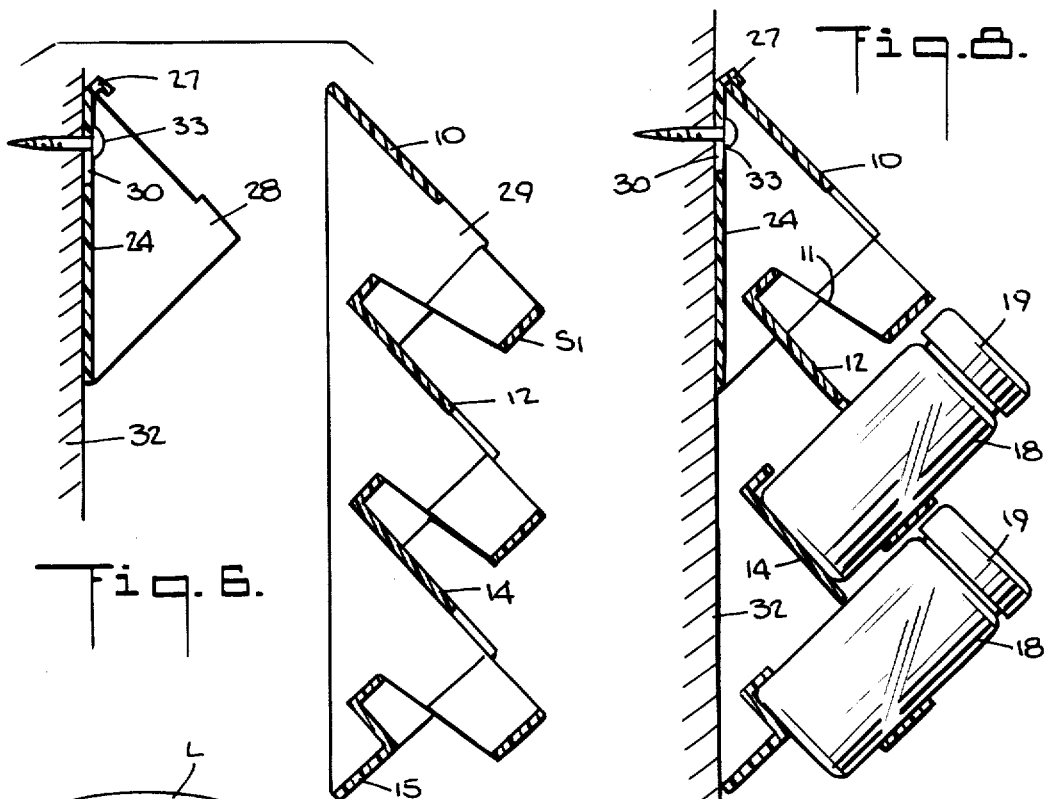
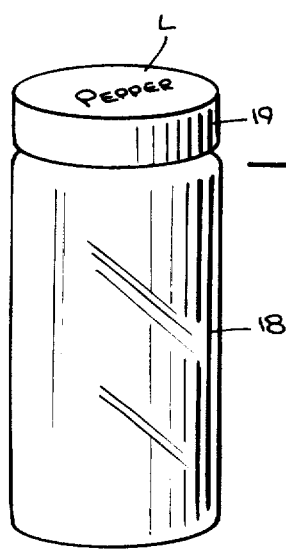
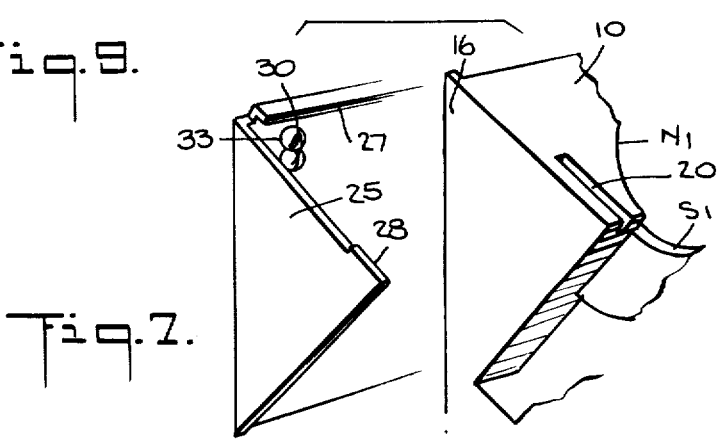

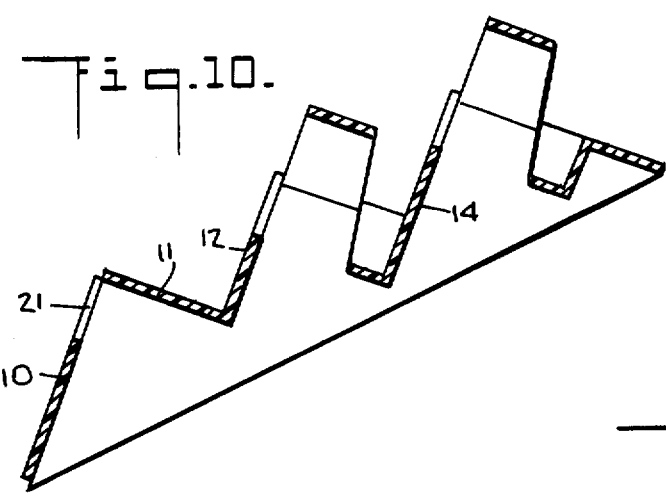
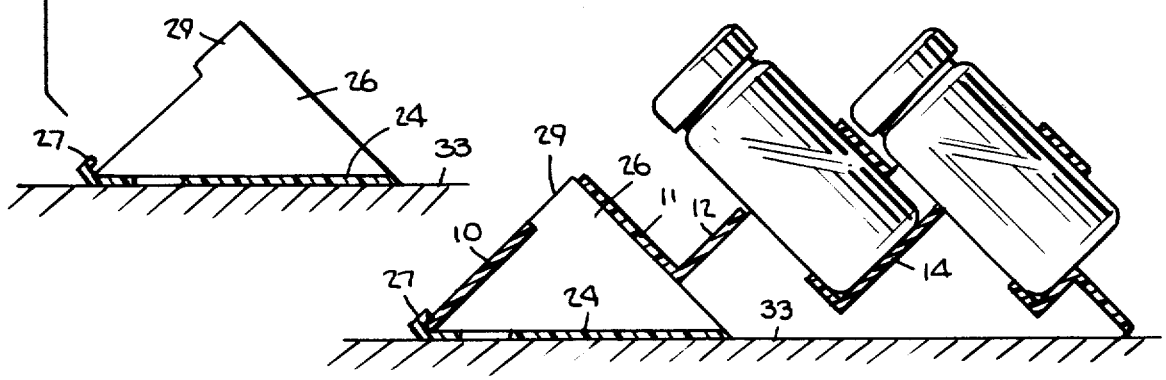
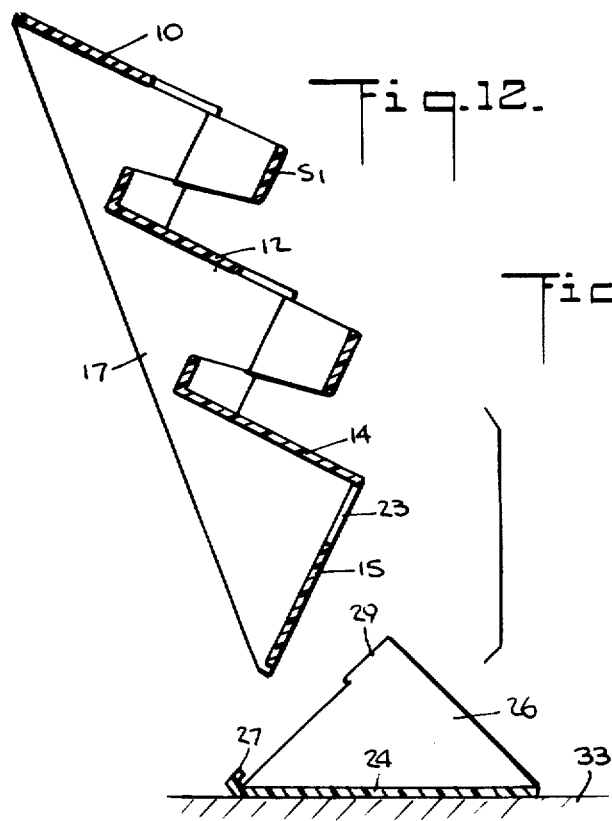
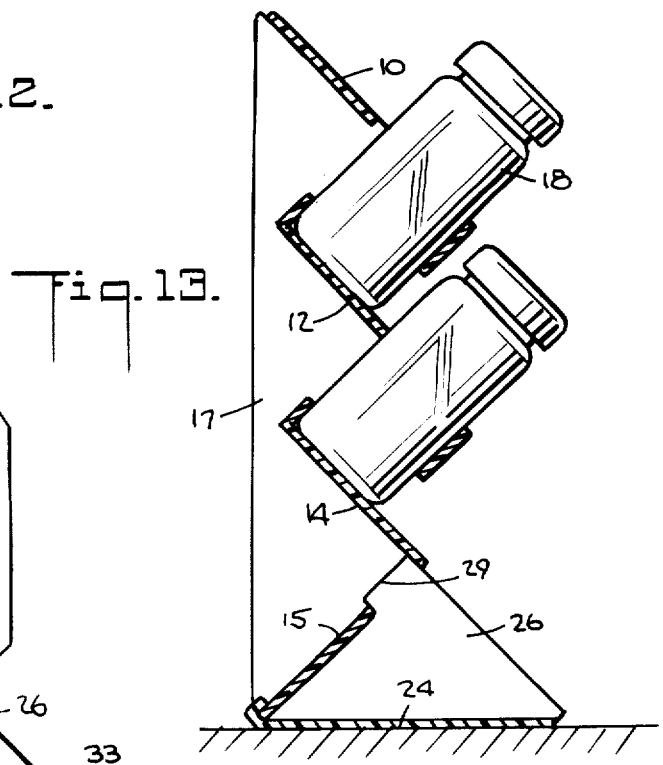

SPICE RACK AND BRACKET ASSEMBLY

BACKGROUND OF INVENTION

This invention relates generally to structures for holding and displaying spice bottles, and more particularly to a spice rack and bracket assembly whose rack is adapted to hold an array of bottles containing different spices and whose bracket is adapted to selectively support the rack in any one of three convenient modes.

Because American culinary taste in recent years has attained a high degree of sophistication, the modern housewife who prepares meals for her family and guests is no longer satisfied with salt, pepper and one or two other basic condiments. The family cook now takes advantage of a full range of seasonings, including aromatic spices such a cloves, cinnamon, nutmeg and anise, and various herbs such as thyme, sage and mint.

Because of the multitude of bottles needed to store a broad range of condiments, it is now the practice to provide racks for this purpose which function as an organizer to afford an orderly and readily accessible assembly of bottles. The typical rack is designed for counter use and consists of two or more rows of sockets which retain the bottles at upright positions. In other cases, the rack is designed for suspension from a wall.

Since the nature of the spice contained in each bottle is usually identified by a label adhered to a screw-on cap, when the cap occupies a horizontal position as in traditional rack arrangements, some labels may be difficult to read. For example, if the rack rests on a counter and holds two or three parallel rows of bottles, while it is not difficult to read the labels on the row nearest the front edge of the counter, it may be difficult to decipher those on the bottle caps in the rear row.

SUMMARY OF INVENTION

In view of the foregoing, the main object of this invention is to provide a rack and bracket assembly whose rack is adapted to hold an array of bottles containing a variety of spices and whose bracket is adapted to selectively support the rack in any one of three modes, whereby one may hang the rack on a wall, cause it to lie flat on a counter or to stand thereon.

A significant feature of the invention is that the rack, regardless of its mode of support, holds the bottles at a tilted position, thereby inclining the bottle caps toward the viewer and making it easier to read the cap label identifying the contents.

More particularly, it is an object of this invention to provide a rack and bracket assembly in which each of these components is constituted by a single piece of molded synthetic plastic material which may be easily cleaned and sterilized.

Also an object of the invention is to provide a spice rack and bracket assembly adapted to concentrate a large number of spice bottles in a relatively small space without, however, creating difficulties in removing any one bottle from the rack.

Briefly stated, these objects are attained in a spice rack and bracket assembly whose rack is adapted to hold an array of bottles containing different spices and whose bracket is selectively adapted to support the rack in any one of three modes, whereby one may hang the rack on a wall, or cause it to lie flat on a counter or to stand thereon.

The rack is constituted by a staircase frame having a series of steps, each formed by a landing and a wall normal thereto, the step landing having a row of semi-circular notches therein each lying in registration with a semi-circular well projecting rearwardly from the associated wall to define one half of a bottle-receiving socket which is completed by a semi-circular shield projecting forwardly from the wall. The uppermost landing and innermost wall of the frame are provided with slots which cooperate with tongues formed on the triangular sides of the rack to support the rack in any desired mode.

OUTLINE OF DRAWINGS

For a better understanding of the invention as well as other objects and further features thereof, reference is made to the following detailed description to be read in conjunction with the accompanying drawings, wherein:

FIG. 1 is a front elevational view of the spice rack included in an assembly in accordance with the invention;

FIG. 2 is a side view of the rack;

FIG. 3 is a rear elevational view of the rack;

FIG. 4 is a section taken in the plane indicated by line 4—4 in FIG. 1;

FIG. 5 is a perspective view of the bracket which cooperates with the rack;

FIG. 6 is a sectional view of the bracket when mounted on a vertical wall and shows how the rack in the wall-mount mode is supported thereby;

FIG. 7 is a partial view, in perspective, showing how the rack is attached to the wall-mounted bracket;

FIG. 8 shows, in section, the rack in the wall-mount mode, with bottles therein;

FIG. 9 illustrates, in perspective, one bottle for containing a spice, the bottle being receivable in a socket in the rack;

FIG. 10 shows the bracket on the counter in the flat counter mode, with the rack in the process of being attached thereto;

FIG. 11 shows the resultant rack and bracket assembly lying flat on the counter;

FIG. 12 shows the rack being attached to the bracket so that it occupies the stand-up counter mode; and FIG. 13 shows the assembly in this stand-up counter mode.

DESCRIPTION OF INVENTION

The Assembly

Referring now to FIGS. 1 and 2, a rack in an assembly in accordance with the invention is constituted by a staircase frame having three steps, the first or uppermost having a landing 10 and a wall 11 normal thereto; the second or intermediate step having a landing 12 and a wall 13 normal thereto; and the third or lowermost step having a landing 14 and a wall 15 normal thereto, the frame having sides 16 and 17. It will be seen that sides 16 and 17 have a sawtooth upper edge resulting from the staircase format of the frame, while the lower edges thereof are straight.

While only three steps are shown to hold three rows of bottles, in practice the rack may have a greater number of steps, or only two steps. The staircase frame may be molded of a suitable synthetic plastic material such as polypropylene or polycarbonate, the plastic material being of a type capable of being cleaned and sterilized in a standard dishwashing machine. The bracket may be similarly fabricated.

Landing 10 of the first step is provided with a row of equi-spaced, semi-circular notches $N_1$, $N_2$, $N_3$ and $N_4$, while wall 11 associated therewith is provided with a corresponding row of rearwardly projecting semi-circular wells $W_1$, $W_2$, $W_3$ and $W_4$ which together with the notches define one half of a bottle-receiving socket. The sockets are completed by semi-circular shields $S_1$, $S_2$, $S_3$ and $S_4$ projecting forwardly from wall 11. The second and third steps are likewise provided with notches, wells and shields to define two additional rows of sockets at progressively lower levels.

The dimensions of the sockets are such as to accommodate cylindrical bottles 18, as shown in FIG. 9, each having a screw-on cap 19 having adhered thereto a label L which identifies the contents (pepper). This label is preferably formed of washable vinyl sheet material having a pressure-sensitive adhesive backing protected by a peel-off sheet. The height of the bottles is greater than that of the socket so that cap 19 is well above the landing of the related step, as shown in FIG. 8.

Formed in landing 10 of the upper step at positions directly adjacent the corners at either end of the landing are slots 20 and 21. Formed on wall 15 of the lower step at the corners at either end thereof is a second set of slots 22 and 23. The term "corner" refers to the junction of a landing and a wall of a step at the side 16 or 17 of the frame.

The bracket, as best seen in FIG. 5, consists of a piece of plastic molded to define a rectangular plate 24 having triangular ends 25 and 26 at right angles to the plate. One edge of plate 24 has an overhang lip 27 and the side of each end facing the lip is provided with a short tongue (28 and 29) which includes the apex of the end.

The length of plate 24 relative to the distance between sides 16 and 17 of the rack is such that the ends 25 and 26 of the bracket are slidable within the sides of the rack, the tongues 28 and 29 being received either in correspondingly-positioned slots 20 and 21 or slots 22 and 23, depending on the selected mode.

Wall-Mount Mode

When the user wishes to hang the rack on a wall 32 as shown in FIGS. 6, 7 and 8, the bracket is bolted or otherwise secured to the wall, as by means of wood screws 32 which pass through the keyholes 30 and 31 in bracket plate 24, which is thereby held against the wall.

After the bracket is mounted on the wall, the rack is suspended therefrom, this being accomplished by inserting the edge of landing 10 of the uppermost step under the overhang of lip 27 on the bracket. The rack is then swung down, using the lip as a pivot to cause the sides of the rack to slide over the parallel ends of the bracket until tongues 28 and 29 enter slots 20 and 21 of landing 10, at which point the rack is securely held in place.

In order to disengage the rack from the bracket, one simply reverses the above procedure. In practice, the bottles are placed in their rack sockets after the rack is in place; and when the rack is to be disengaged, the bottles are first removed therefrom.

Flat Mode

When one wishes to place the rack so that it lies flat on a counter or other horizontal surface, as shown in FIGS. 10 and 11, the bracket is laid on counter 33 so that its lip 27 is in front and its plate on the counter surface.

Then the edge of landing 10 is inserted under the overhang of lip 27 and the rack swung down to cause the sides thereof to slide over the triangular ends 25 and 26 of the bracket until tongues 28 and 29 enter slots 20 and 21 of the rack. In this mode, the rack lying on the counter conceals the bracket except for the exposed lip, and the bracket functions only to stabilize the rack lying flat on the counter. If one wishes to secure the rack and the counter at a fixed position, one may screw the bracket thereto.

Stand-Up Mode

As shown in FIGS. 12 and 13, if one wishes to stand the rack on counter 33, the bracket is placed thereon as in the flat mode; but instead of inserting the edge of the uppermost landing 10 under the overhang of lip 27, the edge of the lowermost step wall 15 is placed thereunder, the lip this time being to the rear of the rack.

Then when the rack is pivoted down on the lip, the tongues 28 and 29 on the ends 25 and 26 of the bracket enter the notches 22 and 23 in the lowermost step wall, so that now the triangular ends 25 and 26 of the bracket support the rack at an upright position with the bottle sockets tilted forwardly to facilitate reading of the labels on the bottle caps. Here again, if one wishes to secure the rack at a permanent stand-up counter position, the bracket may be screwed to the counter.

While there has been shown and described a preferred embodiment of a spice rack and bracket assembly in accordance with the invention, it will be appreciated that many changes and modifications may be made therein without, however, departing from the essential spirit thereof. Thus while the assembly has been described as suitable for storing a variety of spices, it may also be used to store different vitamins or drugs.

And while the invention has been described as made of particular plastic materials, it may also be made of polystyrene or other synthetic or even molded of lightweight metal. The fastening means for the bracket may simply be nails, and even a double-backed adhesive can be used for this purpose.

I claim:

1. A rack and bracket assembly whose rack is adapted to hold an array of bottles containing different spices or other products, said assembly comprising:
   (A) a rack constituted by a staircase frame having a series of steps, each formed by a landing and a wall normal thereto, each landing having a row of semi-circular notches therein, each notch lying in registration with a semi-circular well projecting rearwardly from the associated wall to define one half of a bottle-receiving socket which is completed by a semi-circular shield projecting forwardly from the wall; and
   (B) a bracket operatively coupled to the rack to support it at a desired position.

2. An assembly as set forth in claim 1, wherein each bottle is constituted by a cylindrical container receivable in said socket and a screw-on cap.

3. An assembly as set forth in claim 1, further including washable labels adhesively secured to the caps to identify the contents of the bottle.

4. An assembly as set forth in claim 1, wherein said rack is molded of a single piece of synthetic plastic material capable of being washed and sterilized.

5. An assembly as set forth in claim 1, wherein said frame includes sides which have a sawtooth upper edge defined by said steps and a straight lower edge.

6. An assembly as set forth in claim 5, wherein said bracket is constituted by a rectangular plate having triangular ends, the length of said plate relative to the distance between the sides of the frame being such that the ends are slidable within the sides of the rack.

7. An assembly as set forth in claim 6, wherein the ends of the bracket are provided with tongues which are receivable in correspondingly-positioned slots in the uppermost landing or in the lowermost step well, whereby the rack may be supported by the bracket in different modes, depending on which slots are selected.

8. An assembly as set forth in claim 7, wherein said bracket plate includes holes to permit attachment of the bracket to a wall from which the rack may be suspended in a wall-mount mode.

* * * * *